United States Patent Office 3,520,906
Patented July 21, 1970

3,520,906
OXYALKANOIC BENZOFURAN DERIVATIVES
Fernand Binon and Rene Tondeur, Brussels, Belgium, assignors, by mesne assignments, to Laboratoires Labaz, Paris, France
No Drawing. Filed Sept. 21, 1967, Ser. No. 669,415
Claims priority, application Great Britain, Sept. 22, 1966, 42,428/66
Int. Cl. C07d 5/40
U.S. Cl. 260—346.2      2 Claims

ABSTRACT OF THE DISCLOSURE

Oxyalkanoic benzofuran derivatives having the property of reducing the levels of cholesterol, glycerides, and free fatty acids in the blood plasma and given by the formula:

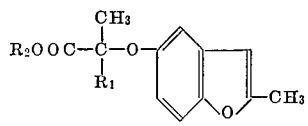

wherein $R_1$ represents hydrogen, methyl or ethyl and $R_2$ represents an alkyl group containing from 1 to 4 carbon atoms.

BRIEF SUMMARY OF THE INVENTION

This invention relates to novel oxyalkanoic benzofuran derivatives.

The benzofuran derivatives with which the present invention is concerned are represented by the general formula:

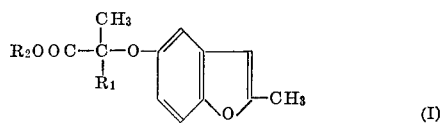

wherein $R_1$ represents hydrogen, methyl or ethyl and $R_2$ represents an alkyl group containing from 1 to 4 carbon atoms.

A preferred compound is ethyl 2-[5-(2-methyl-benzofuranoxy)]-isobutyrate.

The compounds of Formula I have been found to possess valuable pharmacological activity.

Pharmacological trials have shown that the compounds of the invention reduce to an appreciable degree the levels of cholesterol, of glycerides and of free fatty acids in the blood plasma. This pharmacological activity renders the compounds of the invention adapted for use in the chemotherapeutic treatment of all pathological states characterized by high lipid blood-levels such as hypercholesteraemia and hyperlipaemia as well as in the treatment of all forms of atherosclerosis, diabetic atheromatosis, xanthomatosis and circulatory disorders of the brain, of the coronary arteries and of the peripheral vascular system.

It is already known from British Pat. No. 860,303 that the esters of α-(aryloxy)-aliphatic carboxylic acids, and more particularly ethyl 4-chlorophenoxyisobutyrate, reduce the concentration of cholesterol in the blood serum and are, therefore, useful in the treatment of coronary artery disease and atherosclerosis.

It is now recognized that not only the reduction of cholesterol but also of glycerides and free fatty acids in the blood serum can be beneficial in cases of atherosclerosis and consequently of coronary artery disease.

In accordance with this conception, a series of tests were carried out on female rats in order to establish the comparative qualities of the preferred compound of the invention, namely the ethyl 2-[5-(2-methyl-benzofuranoxy)]-isobutyrate and of the known ethyl 2-(4-chlorophenoxy)-isobutyrate of British specification No. 860,303 as reducers of the blood serum levels of cholesterol, glycerides and free fatty acids.

The procedure adopted was as follows:

The female rats were first submitted to ovariectomy and, after a period of eight days, they were divided into three groups of which the first group (A) received ethyl 2-(4-chlorophenoxy)-isobutyrate, the second group (B) received the preferred compound of the invention, namely the ethyl 2 - [5-(2-methyl-benzofuranoxy)]-isobutyrate and the third group (C) were control animals. The two active compounds were administered in daily doses of 50 mg./kg. dissolved in 0.3 ml. of sesame oil per animal. The control animals each received a daily administration of 0.3 ml. of sesame oil. Administration was by oral route and lasted for fourteen days. Twenty-four hours after the last dose, the animals were sacrificed and the relative blood-levels of cholesterol, glycerides and free fatty acids determined.

Taking the average levels of the control animals as standard, the mean results obtained in the two treated groups were as follows:

REDUCTION AS COMPARED WITH CONTROL ANIMALS (C)

|  | Cholesterol | Glycerides | Free fatty acids |
|---|---|---|---|
| Group A, percent | 7.6 | 3.2 | 11.2 |
| Group B, percent | 22.2 | 5.1 | 19.2 |

The above tabular results show that the preferred compound of the invention is more active than the known ester.

Both compounds are practically non-toxic, their $LD_{50}$ values, as determined by intraperitoneal route on the mouse, being so high as to be without significance. In the case of the known ester this value is 1625 mg./kg. while in the case of the preferred compound of the invention it is 1300 mg./kg.

It will be appreciated that for therapeutic use the compounds of the invention will normally be administered in the form of a pharmaceutical composition comprising as an essential active ingredient a compound of Formula I in association with a pharmaceutical carrier therefor. The carrier will be preferably a liquid diluent of the kind normally employed in the production of medicaments ready for use such as, for example, a vegetable oil. Advantageously, the composition will be made up in a dosage unit form for administration by oral route. Thus the dosage unit form may be, for example, a soft gelatin capsule. The quantity of active ingredient in each dosage unit may be such that one or more units are required for each therapeutic administration. For example, the dosage unit may contain from 50 mg. to 350 mg. of the active ingredient.

The compounds of the invention may be prepared by novel methods employing standard procedures. For example, the compounds of the invention may be prepared by one of two processes according to the meaning attributed to $R_1$ in Formula I.

In both processes, the starting product is the known benzofuran:

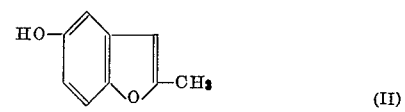

disclosed by Grinev et al. in the J. Chim. Gen. U.S.S.R., 27, 1172 (1957).

According to one process, the compounds of Formula I, in which $R_1$ is methyl or ethyl, may be prepared by reacting the benzofuran of Formula II with a ketone of the general formula:

(III)

wherein $R_1$ is methyl or ethyl, in the presence of chloroform and sodium or potassium hydroxide to give the corresponding acid of the general formula:

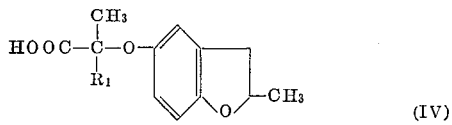
(IV)

wherein $R_1$ is methyl or ethyl, which acid is then esterified in a known manner to provide the corresponding compound of Formula I.

According to the other process, the compounds of Formula I, in which $R_1$ is hydrogen, methyl or ethyl, may be prepared by etherifying the phenolic group of the benzofuran of Formula II with an alkyl ester of the formula:

(V)

wherein $R_1$ is hydrogen, methyl or ethyl, $R_2$ represents an alkyl group containing from 1 to 4 carbon atoms and X is chlorine or bromine to provide the corresponding ether.

DETAILED DESCRIPTION

The following examples illustrate the invention.

EXAMPLE 1

Preparation of ethyl 2-[5-(2-methyl-benzofuranoxy)]-isobutyrate 652 g. of sodium hydroxide (16.3 mol) were maintained, by stirring, in suspension in 2000 ml. of anhydrous acetone. To this suspension were added 404 g. (2.72 mol) of 5-hydroxy-2-methyl-benzofuran and the resulting mixture was refluxed.

The source of heat was removed and 653 ml. of dry chloroform were added at the rate required to maintain regular reflux. When all the chloroform had been added, the solution was heated and refluxed for 5 hours.

The solvents were then evaporated and the residue so formed taken up in water until complete dissolution was achieved. The aqueous solution was acidified by means of concentrated hydrochloric acid and then extracted with chloroform. The organic phase was separated out and extracted by means of a normal solution of sodium bicarbonate.

The alkaline aqueous solution so obtained was acidified with concentrated hydrochloric acid and extracted with chloroform. The chloroform solution was dried over anhydrous potassium sulphate and distilled. In this manner, 563 g. of 2-[5-(2-methyl-benzofuranoxy)]-isobutyric acid were obtained in oily form which was then dissolved in 1500 ml. of absolute ethanol containing 45 ml. of concentrated sulphuric acid and the solution refluxed for 16 hours. The ethanol was partially evaporated and the residue taken up with water and extracted with ether. The ethereal solution was washed with a diluted solution of sodium bicarbonate and then with water, after which it was dried over anhydrous sodium sulphate. After evaporation of the ether, the residue was distilled under high vacuum. In this manner, 434 g. of ethyl 2-[5-(2-methyl-benzofuranoxy)]-isobutyrate were obtained, boiling at 114–121° C. (0.3 mm. Hg).

By using the same process but replacing the acetone by methyl-ethyl-ketone, ethyl 2-methyl-2-[5-(2-methyl-benzofuranoxy)]-butyrate was obtained, boiling at 128–130° C. (0.3 mm. Hg).

EXAMPLE 2

Preparation of methyl 2-[5-(2-methyl-benzofuranoxy)]-isobutyrate

A solution of 15 g. of 2-[5-(2-methyl-benzofuranoxy)]-isobutyric acid (prepared in the manner described in Example 1) in 45 ml. of anhydrous methanol and 1.5 ml. of concentrated sulphuric acid was refluxed for 5 hours.

The methanol was partially evaporated and the residue taken up with water and extracted with ether. The ethereal solution thus obtained was treated as described in Example 1 to give 9.05 g. of methyl 2-[5-(2-methyl-benzofuranoxy)]-isobutyrate, B.P. 105–107° C. (0.3 mm. Hg).

EXAMPLE 3

Preparation of n-butyl 2-[5-(2-methyl-benzofuranoxy)]-isobutyrate 15 g. of 2-[5-(2-methyl-benzofuranoxy)]-isobutyric acid (prepared in the manner described in Example 1) were dissolved in 45 ml. of n-butanol containing 1.5 ml. of sulphuric acid and refluxed for 10 hours.

The n-butanol was partially evaporated and the residue taken up with water and extracted with ether. The ethereal solution thus obtained was treated as described in Example 1 to give 7.5 g. of n-butyl 2-[5-(2-methyl-benzofuranoxy)]-isobutyrate, B.P. 130° C. (0.3 mm. Hg).

EXAMPLE 4

Preparation of isopropyl 2-[5-(2-methyl-benzofuranoxy)]-isobutyrate 30 g. of 2-[5-(2-methyl-benzofuranoxy)]-isobutyric acid (prepared in the manner described in Example 1) were dissolved in 100 ml. of isopropanol containing 5 ml. of concentrated sulphuric acid and refluxed for 10 hours.

The resulting solution was treated in the manner described in Example 1 to give 22.9 g. of isopropyl 2-[5-(2-methyl-benzofuranoxy)]-isobutyrate, B.P. 117–118° C. (0.2 mm. Hg).

EXAMPLE 5

Preparation of n-propyl 2-[5-(2-methyl-benzofuranoxy)]-isobutyrate 30 g. of 2-[5-(2-methyl-benzofuranoxy)]-isobutyric acid (prepared in the manner described in Example 1) were dissolved in 100 ml. of n-propanol containing 5 ml. of concentrated sulphuric acid and refluxed for 10 hours.

The resulting solution was treated in the manner described in Example 1 to give 28.1 g. of n-propyl 2-[5-(2-methyl-benzofuranoxy)]-isobutyrate, B.P. 117–120° C. (0.2 mm. Hg).

EXAMPLE 6

Preparation of ethyl 2-[5-(2-methyl-benzofuranoxy)]-isobutyrate 41.5 g. (0.27 mol) of 5-hydroxy-2-methyl-benzofuran were dissolved in 500 ml. of toluene. To this solution was added a solution of sodium methylate prepared by reacting 6.9 g. of sodium (0.3 mol) with 50 ml. of anhydrous methanol.

The methanol present in the solution was distilled off up to a temperature of 110° C. at the head of the column. 60 g. (0.306 mol) of ethyl 2-bromoisobutyrate were added and the solution refluxed for 16 hours, while being stirred, after which it was washed with water, then with a 2 N solution of sodium hydroxide and finally again with water.

The toluene was distilled off and the residue purified by distillation under high vacuum. In this manner, 51 g. of ethyl 2-[5-(2-methyl-benzofuranoxy)]-isobutyrate were obtained, boiling at 114–121° C. (0.3 ml. Hg).

When the ethyl 2-bromoisobutyrate was replaced by isopropyl 2-bromoisobutyrate, isopropyl 2-[5-(2-methyl-benzofuranoxy)]-isobutyrate was obtained, boiling at 117–118° C. (0.2 mm. Hg).

Likewise, replacement of the ethyl 2-bromoisobutyrate by n-propyl 2-bromoisobutyrate provided n-propyl 2-[5-(2-methyl-benzofuranoxy)]-isobutyrate, boiling at 117–120° C. (0.2 mm. Hg).

EXAMPLE 7

Preparation of methyl 2-[5-(2-methyl-benzofuranoxy)]-isobutyrate

By following the procedure described in Example 6 but using methyl 2-bromoisobutyrate, there was obtained methyl 2-[5-(2-methyl-benzofuranoxy)]-isobutyrate, boiling at 105–107° C. (0.3 mm. Hg).

EXAMPLE 8

Preparation of n-butyl 2-[5-(2-methyl-benzofuranoxy)]-isobutyrate

By employing n-butyl 2-bromoisobutyrate in the procedure described in Example 6, there was obtained n-butyl 2-[5-(2-methyl-benzofuranoxy)] - isobutyrate, boiling at 130° C. (0.3 mm. Hg).

EXAMPLE 9

Preparation of ethyl 2-methyl-2-[5-(2-methyl-benzofuranoxy)]-butyrate

By following the procedure described in Example 6 above, but using 148 g. (1 mol) of 5-hydroxy-2-methylbenzofuran in 1500 ml. of toluene, 23 g. (1 mol) of sodium dissolved in 250 ml. of anhydrous methanol and 210 g. (1 mol) of ethyl 2-methyl-2-bromobutyrate, 152 g. of ethyl 2-methyl-2-[5-(2-methyl-benzofuranoxy)]-butyrate were obtained, boiling at 128–130° C. (0.3 mm. Hg).

EXAMPLE 10

Preparation of ethyl 2-[5-(2-methyl-benzofuranoxy)]-propionate 100 g. (0.7 mol) of 5-hydroxy-2-methyl-benzofuran were dissolved in 1000 ml. of acetone. To the resulting solution were added 193 g. (1.4 mol) of anyhdrous potassium carbonate and 130 g. (0.77 mol) of ethyl 2-bromopropionate.

The solution was refluxed for 20 hours, the mineral salts filtered out and the acetone evaporated.

The residue was extracted with ether and the ethereal solution washed with a 2 N solution of sodium hydroxide and then with water. The solvent was then evaporated and the residue distilled. In this way, 145.7 g. of ethyl 2-[5-(2-methyl-benzofuranoxy)]-propionate were obtained, boiling at 115–117° C. (0.15 mm. Hg).

EXAMPLE 11

Soft gelatin capsules containing the following ingredients were made up in accordance with known pharmaceutical techniques:

| | Mg. |
|---|---|
| Ethyl 2-[5-(2-methyl-benzofuranoxy)]-isobutyrate | 200 |
| Colza oil | 50 |
| | 250 |

The capsule itself may be of any type suitable for containing the liquid active ingredient. As an example, such a capsule could be composed of gelatin, glycerine, ethyl p-hydroxybenzoate and propyl p-hydroxybenzoate.

We claim:
1. A compound of the formula:

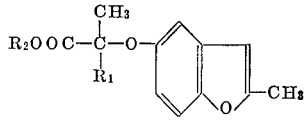

wherein $R_1$ is hydrogen, methyl or ethyl and $R_2$ is an alkyl group containing from 1 to 4 carbon atoms.

2. A compound as claimed in claim 1 which is ethyl 2-[5-(2-methyl-benzofuranoxy)]-isobutyrate.

References Cited

UNITED STATES PATENTS 3,452,085    6/1969    Lauria et al. _____260—346.2

ALEX MAZEL, Primary Examiner

B. I. DENTZ, Assistant Examiner

U.S. Cl. X.R.

424—285